US007023187B2

(12) United States Patent
Shearon et al.

(10) Patent No.: US 7,023,187 B2
(45) Date of Patent: Apr. 4, 2006

(54) INTEGRATED CIRCUIT FOR GENERATING A PLURALITY OF DIRECT CURRENT (DC) OUTPUT VOLTAGES

(75) Inventors: William B. Shearon, Findlay, OH (US); Paul K. Sferrazza, Somerville, NJ (US)

(73) Assignee: Intersil Americas Inc., Milpitas, CA (US)

( * ) Notice: Subject to any disclaimer, the term of this patent is extended or adjusted under 35 U.S.C. 154(b) by 559 days.

(21) Appl. No.: 10/213,766

(22) Filed: Aug. 7, 2002

(65) Prior Publication Data

US 2003/0035260 A1 Feb. 20, 2003

Related U.S. Application Data

(60) Provisional application No. 60/312,826, filed on Aug. 16, 2001.

(51) Int. Cl.
*H02M 3/158* (2006.01)

(52) U.S. Cl. ....................... 323/266; 323/267; 323/901

(58) Field of Classification Search .................. 307/82, 307/29, 77, 65; 363/65, 49, 21.01, 267, 901, 363/266, 271
See application file for complete search history.

(56) References Cited

U.S. PATENT DOCUMENTS 2,929,924 A * 3/1960 Miller ........................ 330/145
4,313,155 A 1/1982 Bock et al. ................... 363/49
4,361,865 A * 11/1982 Shono ......................... 363/19
4,504,898 A 3/1985 Pilukaitis et al. ............. 363/49
4,628,426 A * 12/1986 Steigerwald ................. 363/17
4,887,199 A * 12/1989 Whittle ........................ 363/49
4,935,858 A * 6/1990 Panicali ................... 363/21.01
5,267,135 A * 11/1993 Tezuka et al. ................ 363/49
5,307,004 A * 4/1994 Carsten ...................... 323/222
5,400,239 A * 3/1995 Caine ......................... 363/67
5,455,501 A * 10/1995 Massie ....................... 323/267
5,715,153 A * 2/1998 Lu ............................. 363/65
5,861,737 A * 1/1999 Goerke et al. .............. 323/282
5,886,508 A * 3/1999 Jutras ........................ 323/267
5,903,138 A * 5/1999 Hwang et al. .............. 323/266
5,991,168 A * 11/1999 Farrington et al. ........... 363/16
6,067,241 A 5/2000 Lu ............................. 363/65
6,087,817 A * 7/2000 Varga ........................ 323/282
6,195,275 B1 2/2001 Lu ............................. 363/65
6,198,642 B1 * 3/2001 Kociecki .................... 363/37

(Continued)

OTHER PUBLICATIONS

Lokhandwala, Adnan M. and Sudip K. Mazumder. "Discrete Validation of Smart Power ASIC (SPIC) for a Distributed Power System". 2004 35th Annual IEEE Power Electronics Specialists Conference.*

(Continued)

*Primary Examiner*—Brian Sircus
*Assistant Examiner*—Andrew Deschere
(74) *Attorney, Agent, or Firm*—Allen, Dyer, Doppelt, Milbrath & Gilchrist, P.A.

(57) ABSTRACT

A cascaded DC-DC converter architecture has an upstream converter stage and a downstream converter stage, which derives its input voltage from the upstream stage. Cascading the two converter stages enables functionality of control and monitoring (including soft start and overcurrent detection) circuitry of the upstream stage to be used for the downstream stage, to reduce chip area, cost, and complexity. A voltage window regulator in the downstream converter ensures that, during shutdown, its output voltage will be maintained within a prescribed window of its regulated output voltage, so that no soft start delay is needed when the second converter stage is turned back on.

9 Claims, 3 Drawing Sheets

U.S. PATENT DOCUMENTS

| | | | | |
|---|---|---|---|---|
| 6,222,352 | B1 * | 4/2001 | Lenk | 323/267 |
| 6,297,976 | B1 * | 10/2001 | Isono | 363/65 |
| 6,430,070 | B1 * | 8/2002 | Shi et al. | 363/97 |
| 6,469,478 | B1 * | 10/2002 | Curtin | 323/266 |
| 6,515,880 | B1 * | 2/2003 | Evans et al. | 363/49 |
| 6,611,436 | B1 * | 8/2003 | Nishida et al. | 363/21.07 |
| 6,756,772 | B1 * | 6/2004 | McGinnis | 323/225 |
| 6,771,052 | B1 * | 8/2004 | Ostojic | 323/266 |
| 6,813,170 | B1 * | 11/2004 | Yang | 363/56.09 |
| 6,838,861 | B1 * | 1/2005 | Testin | 323/267 |

OTHER PUBLICATIONS

U.S. Appl. No. 09/442,299, entitled: Active Decoupling and Power Management Circuit for Line-Powered Ringing Generator.

U.S. Appl. No. 09/378,382, entitled: Power-Limited Remote Termination Converter with Wetting Current and Emergency Power Operation for Digital Data Services Equipment.

* cited by examiner

INTEGRATED CIRCUIT FOR GENERATING A PLURALITY OF DIRECT CURRENT (DC) OUTPUT VOLTAGES

CROSS-REFERENCE TO RELATED APPLICATION

The present application claims the benefit of co-pending Provisional Patent Application, Ser. No. 60/312,826, filed Aug. 16, 2001, entitled: "Integrated Circuit for Generating a Plurality of Direct Current (DC) Output Voltages," by W. Shearon et al, assigned to the assignee of the present application and the disclosure of which is incorporated herein.

FIELD OF THE INVENTION

The present invention relates in general to electronic circuits and components therefor, and is particularly directed to a new and improved dual cascaded, buck mode DC power supply architecture for generating a plurality of DC voltages from a single supply voltage, and reducing the complexity of circuitry used to control the operation of multiple power supply stages.

BACKGROUND OF THE INVENTION

Electrical power for an integrated circuit (IC) is typically supplied by one or more direct current (DC) power sources, such as a buck-mode, pulse width modulation (PWM) DC-DC converter of the type diagrammatically shown in FIG. 1. In the illustrated buck-mode converter, a DC-DC controller 10 switchably controls the turn-on and turn-off of a pair of power switching devices, respectively depicted as an upper power MOSFET device 20 and a lower power MOSFET device 30. These power MOSFET switching devices have their drain-source paths coupled in series between first and second bias supply voltages (VCC and ground (GND)). A common or phase voltage node 25 between the two power MOSFETs 20/30 is coupled through an inductor 40 to a capacitor 50, which is coupled to a reference voltage terminal (GND). The connection 45 between inductor 40 and capacitor 50 serves as an output node from which a desired (regulated) DC output voltage Vout is derived.

The buck converter's DC-DC controller 10 includes a pair of gate driver circuits 11 and 12, which controllably turn respective switching devices 20 and 30 on and off, in accordance with a pulse width modulation (PWM) switching waveform produced by a comparator 13. The upper MOSFET device 20 is turned on and off by an upper gate switching signal UG applied by the gate driver 11 to the gate of the MOSFET device 20, and the MOSFET device 30 is turned on and off by a lower gate switching signal LG applied by the gate driver 12 to the gate of the MOSFET device 30.

To produce the PWM waveform, comparator 13 compares the signal level of a periodic reference waveform, such a sawtooth signal supplied by a sawtooth generator 14, with a reference voltage output by an error amplifier 15. The frequency of the PWM waveform corresponds to that of the periodic waveform supplied by generator 14, while the duty cycle of the PWM signal is controlled by the output of the error amplifier 15. For this purpose, the error amplifier 15 compares a fraction of the output voltage Vout at the output node 45, as derived by voltage divider 16, and coupled through a soft start circuit 17, with prescribed reference voltage 18. As further shown in FIG. 1, the DC-DC controller 10 may include an overcurrent detector 19 coupled via resistor 23 to the VCC bias voltage terminal, and to node 25. A shut down circuit 22 is controlled by the output of the overcurrent detector, so as to controllably interrupt operation of the power supply in the event of an overcurrent condition.

In a number of situations, it may be necessary to provide one or more operating voltages that are different from the available supply voltage on a single card. In at least one application, such as a dual-data-rate (DDR) memory system employing DDR random access memories (DRAMs), two supply voltages are required. Typically, a second supply voltage will be a prescribed fraction (e.g., one-half) of a first supply voltage, and generally may not exceed the first supply voltage.

For improved integration density, where the DC power supply is regulated by an integrated circuit, it is desirable to combine control functions for the multiple power supplies in a single IC. Although implementing a multi voltage supply may be a technical challenge, the benefits of efficiency encourage its pursuit. One straightforward way to configure a dual voltage converter is to simply fabricate two discrete circuits of the type, such as that shown in FIG. 1, on a common motherboard. A similar approach is described in the U.S. Pat. No. 6,067,241 to Q. Lu, entitled "Dual-Output DC-DC Power Supply." Lu proposes cascading two types of DC converters—a forward DC-DC converter and a buck converter—in order to realize a 'half-brick' sized power supply.

Now although such a 'doubled' DC converter architecture may provide two different voltages, each supply is effectively a discrete, stand-alone circuit, having its own dedicated controller. This fact, coupled with the large size and complexity of the soft start and overcurrent detection circuitry for each converter, make the resulting multi voltage supply configuration relatively complex, expensive, as well as requiring a significant amount of chip area. Moreover, implementing a pair of discrete converters of the type described in the Lu patent is problematic at best, due to its use of a forward DC-DC converter circuit, which contains a transformer. As such, this type of DC power supply architecture is not practical for powering highly integrated electronic components, such as DDR DRAMs, and the like.

SUMMARY OF THE INVENTION

In accordance with the present invention, problems of multi DC-DC converter architectures, including those described above, are effectively obviated by a multi (dual) voltage power supply architecture, in which an upstream buck converter stage is coupled in cascade with a downstream buck converter stage, such that the downstream converter its input voltage from the output of the upstream converter, and generates an output DC voltage that is a prescribed fraction of that input voltage. In addition, the manner in which the two buck converter stages are cascaded enables the functionality of the control and monitoring circuitry (e.g., soft start and overcurrent detection circuitry) of upstream converter to be employed for the downstream converter.

Since the downstream converter stage derives all of its supply current from the output voltage produced by the upstream stage, the overcurrent detector for the downstream converter stage can be eliminated. Instead, an overcurrent detector in the upstream buck converter's DC-DC controller effectively serves both converter stages. This means that only a single overcurrent set resistor and associated terminal on the IC package is required. The cascade connection between the two converters also satisfies the requirement that the downstream converter's output voltage not exceed the upstream converter's output voltage.

In addition, since the downstream converter stage derives its input voltage from the upstream converter stage, an error amplifier used to generate the PWM pulse train that controls turn on and turn off of the power switching devices of the downstream converter stage will effectively continuously track a prescribed fraction (e.g., one-half) of the upstream converter's output voltage, including after soft start of the upstream converter stage. As a result, soft-start characteristics of the upstream converter stage are effectively 'mirrored' in the downstream converter stage, eliminating the need for a separate soft start circuit in the downstream stage.

In addition, the downstream converter stage is configured to be selectively disabled or shut down by an external signal. To ensure that the output voltage of the downstream converter stage will not drift 'too far away' from its intended value, which might otherwise prohibit a soft start after shut down is concluded (unless fairly complex voltage detection circuitry is employed), the downstream converter stage employs a voltage window or 'keep alive' regulator. This voltage window regulator receives a voltage proportional to the output voltage produced by the downstream converter stage, and an externally supplied shut down control signal. The use of an external shutdown signal makes it possible to selectively shut down the second DC-to-DC converter, independently of the upstream converter stage. This reduces a limitation of conventional buck-mode PWM converters, which typically consume a significant amount of power, even when not being used.

Thus, one or both converter stages may be shut down when not in use, with the voltage window regulator of the downstream converter stage maintaining its output voltage within a prescribed voltage window, to eliminate the need for a soft start delay when the second converter is turned back on. This is possible since, during shut down, loading on the output voltage is typically light, allowing a relatively simple, light-duty regulator to be used for the window regulator. As a non-limiting example, the downstream converter stage's window regulator may be implemented using a low cost circuit comprising a resistor and a linear regulator.

DETAILED DESCRIPTION

Before describing a non-limiting, but preferred embodiment of the dual buck-mode PWM power supply of the present invention, it should be observed that the invention resides primarily in an arrangement of conventional DC power supply circuit and control components, and the manner in which they are integrated together to realize a shared control, multi-voltage power supply architecture of the type described briefly above. It is to be understood that the present invention may be embodied in a variety of other implementations, and should not be construed as being limited to only that shown and described herein. Rather, the implementation example shown and described here is intended to supply only those specifics that are pertinent to the present invention, so as not to obscure the disclosure with details that are readily apparent to one skilled in the art having the benefit of present description. Throughout the text and drawings like numbers refer to like parts.

Figure 2:
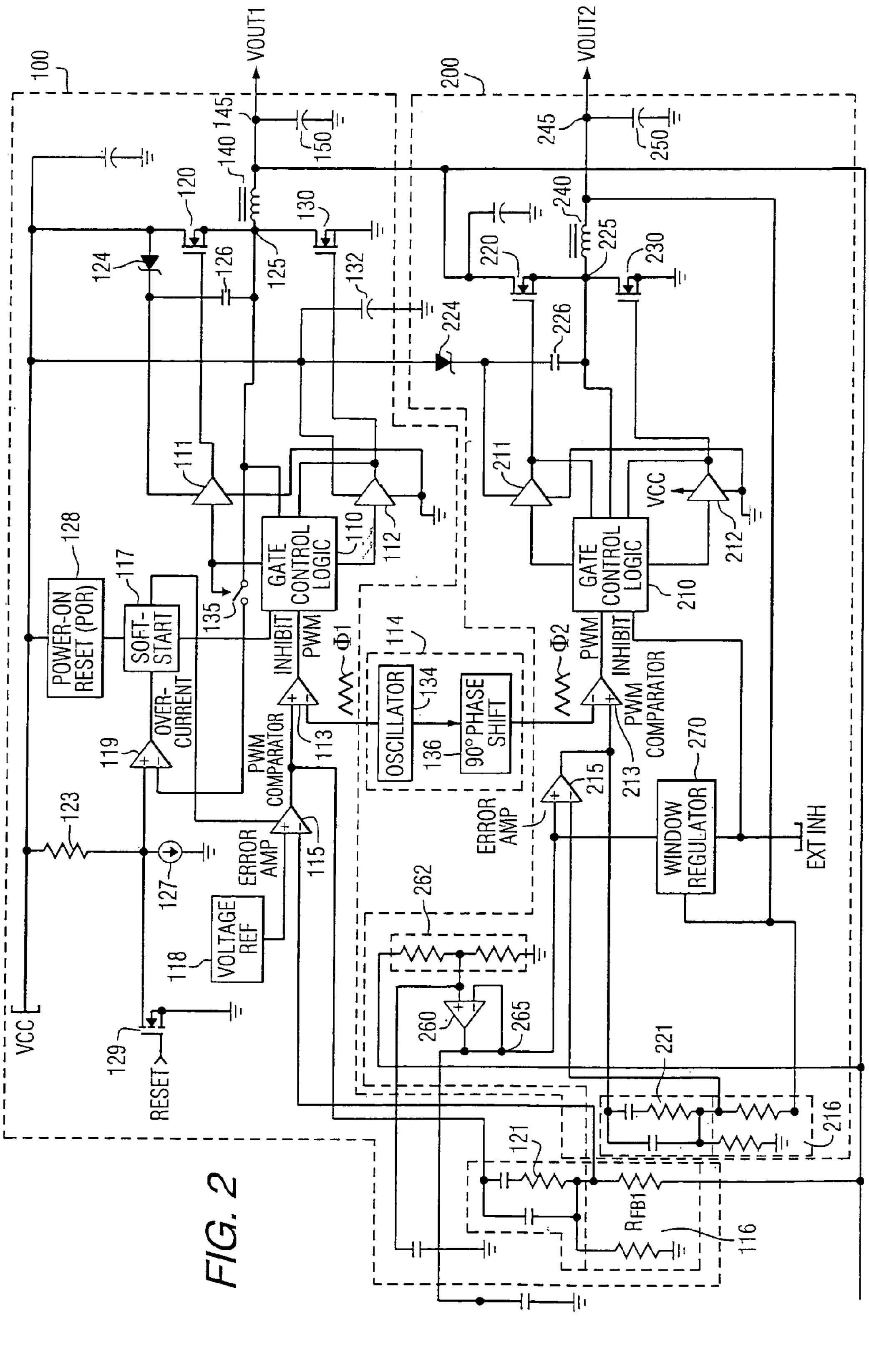
FIG. 2 diagrammatically illustrates a dual buck-mode PWM power supply according to the present invention.

Attention is now directed to FIG. 2, which diagrammatically illustrates the architecture of a multi (dual) buck-mode PWM power supply in accordance a non-limiting, but preferred embodiment of the present invention. As described briefly above and as will be detailed hereafter, the multi voltage power supply according to the invention is formed of a plurality of cascaded buck converter stages. Because of the manner in which the two converters are cascaded, the downstream converter derives its input voltage from the output of the first converter, and is operative to generate an output DC voltage that is a prescribed fraction (one-half, as a non-limiting example) of that input voltage. Moreover, this cascading allows control and monitoring functionality (e.g., soft start and overcurrent detection circuitry) of the downstream converter to be consolidated with the operation of the first converter.

Figure 1:
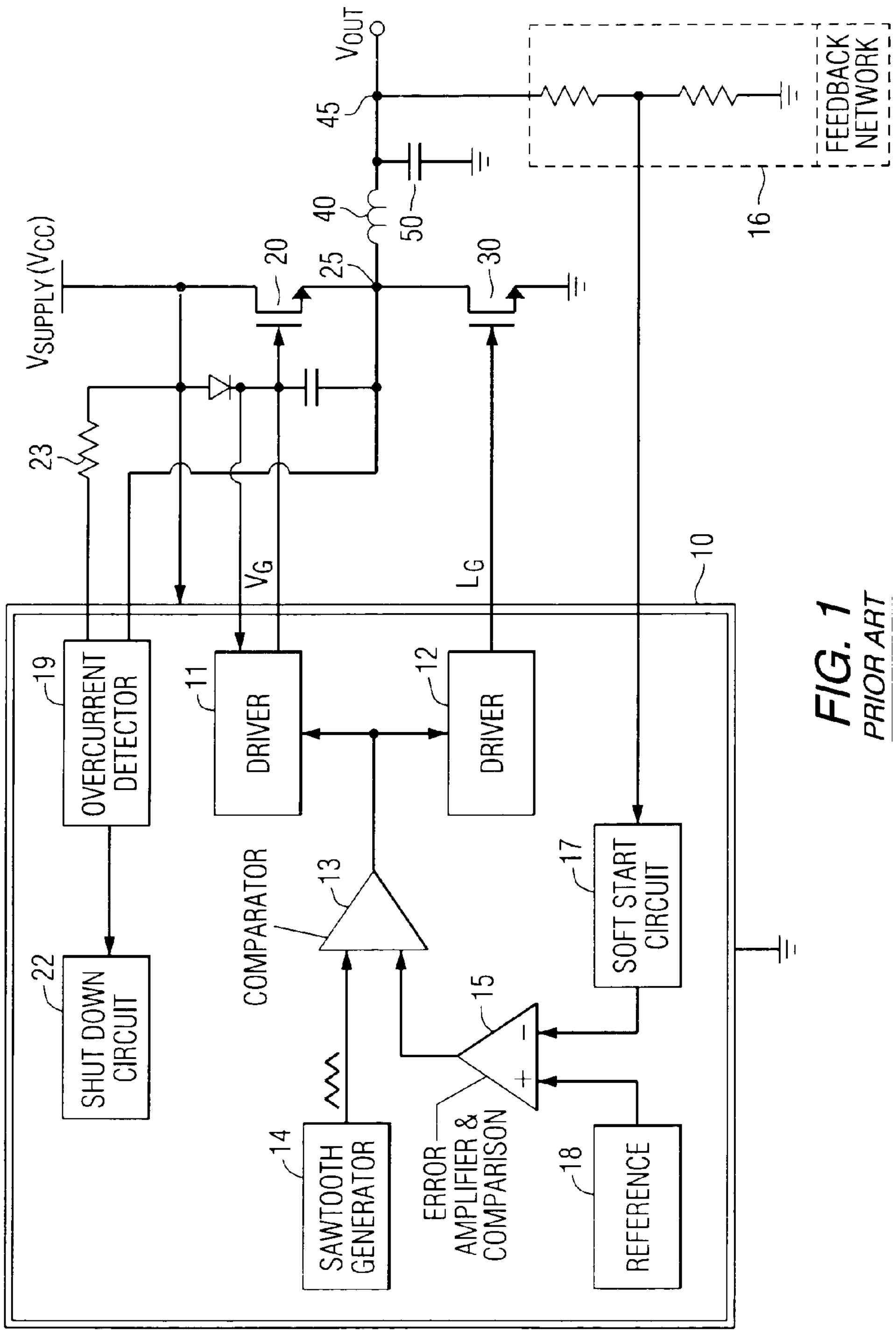
FIG. 1 diagrammatically illustrates a conventional buck-mode PWM power supply.

To this end, the multi stage power supply of the invention (shown as a dual stage converter) comprises a first (upstream) DC-DC converter 100 having its output cascaded (in an inductorless manner (e.g., without a coupling transformer therebetween)) with a second (downstream) DC-DC converter 200, each of which may be configured as a buck mode converter of the type shown in FIG. 1. Upstream converter 100 includes a pair of electronic power switching devices, respectively shown as an upper power MOSFET device 120 and a lower power MOSFET device 130, having their drain-source paths coupled in series between VCC and GND. A phase voltage node 125 between FETs 120/130 is coupled through an inductor 140 to a capacitor 150 referenced to GND.

The connection 145 between inductor 140 and capacitor 150 serves as an upstream output node from which a first regulated DC output voltage Vout1 is derived. For the non-limiting example of supplying a regulated voltage to a DDR DRAM, the first, relatively larger output voltage Vout1 may provide a $V_{DDQ}$ supply voltage to the DRAM. As will be described, this first regulated DC output voltage Vout1 is provided as the input voltage to the downstream converter stage 200. As will be described, with downstream converter stage 200 receiving its input voltage from upstream converter stage 100, an error amplifier that generates the PWM pulse train that controls turn on and turn off of MOSFET switching circuits of the downstream converter stage will effectively continuously track a prescribed fraction of the upstream converter's output voltage Vout1, including after soft start of the upstream converter stage. This enables the soft-start characteristics of upstream converter stage 100 to be effectively 'mirrored' in the downstream DC-to-DC converter stage, eliminating the need for a separate soft start circuit in the downstream stage.

Upstream buck converter 100 includes a gate control logic circuit 110, which supplies switching control signals to a pair of gate driver circuits 111 and 112, for controllably turning respective switching devices 120 and 130 on and off, in accordance with a PWM switching waveform produced by a PWM comparator 113 and applied to its PWM input. Gate driver circuit 111 is coupled with an associated bias diode and capacitor network containing diode 124 and capacitor 126, and gate driver circuit 112 is coupled with an associated capacitor 132. To produce the PWM switching waveform, PWM comparator 113 compares the signal level of a first periodic reference waveform Φ1, supplied by a dual phase sawtooth signal generator 114, with a voltage output by a duty cycle-controlling error amplifier 115.

Dual phase sawtooth signal generator 114 is shown as comprising an oscillator 134, from which the first sawtooth waveform Φ1 is supplied, and a 90° phase shifter 136, that imparts a 90° phase shift to the sawtooth waveform Φ1, so as to produce a second sawtooth waveform Φ2 for application to the downstream converter 200. Error amplifier 115 compares a fraction of the output voltage Vout1 at output node 145, as derived by a voltage divider 116, to which a feedback compensation filter 121 is coupled, with a reference voltage 118.

The upstream buck converter 100 also includes an overcurrent detector 119, which has a first input coupled to a node between a fixed current source 127 and an overcurrent setting resistor 123, coupled to the VCC supply voltage rail, to set the overcurrent trip threshold. A Reset MOSFET switch 129 is coupled to the connection of overcurrent setting resistor 123 and overcurrent detector 119. Applying a turn-on gate signal to Reset MOSFET switch reduces the VCC-referenced bias supplied through resistor 123, to trip the overcurrent detector and reset the dual stage converter.

A second input of overcurrent detector 119 is coupled through a switch 135 to the phase node 125. The output of overcurrent detector 119 is coupled to a soft start circuit 117, which is coupled to VCC through a power on reset switch 128, and is coupled to error amplifier 115 and an inhibit input of gate control logic circuit 110. In response to an overcurrent condition, which trips the overcurrent detector 119, the output of detector 119 changes state and triggers the soft start circuit 117.

Since it is coupled in cascade with the upstream converter 100, the downstream converter 200 derives all of its supply current from the output (i.e., Vout1) of the upstream converter, so that the overcurrent detector 119 effectively serves both converter stages, eliminating the need for an overcurrent detector in downstream converter stage 200, so that only the single overcurrent set resistor 123 and an associated terminal on the IC package are required. The cascade connection between converters 100 and 200 also satisfies the requirement that the output voltage Vout2 of the downstream converter not exceed the upstream output voltage Vout1, and provides a significant savings in chip area, cost, and complexity to be realized.

The downstream buck mode converter 200 includes a pair of electronic power switching devices, respectively shown as an upper MOSFET device 220 and a lower MOSFET device 230, having their drainsource paths coupled in series between the output node VOUT1 of the upstream buck mode converter 100 and GND. A phase voltage node 225 between FETs 220/230 is coupled through an inductor 240 to a capacitor 250, which is referenced to GND. The connection 245 between inductor 240 and capacitor 250 serves as a downstream output node from which a second regulated DC output voltage Vout2 is derived. For the non-limiting example of supplying a regulated voltage to a DDR DRAM, output voltage Vout2 may provide a $V_{TT}$ supply voltage to the DRAM.

A gate control circuit 210 for downstream buck converter 200 supplies switching control signals to gate driver circuits 211 and 212, so as to controllably turn respective power MOSFET switching devices 220 and 230 on and off, in accordance with a PWM switching waveform produce by a comparator 213. Gate driver circuit 211 is coupled with an associated bias diode and capacitor network containing diode 224 and capacitor 226, and gate driver circuit 212 is coupled with an associated capacitor (not shown). To produce its PWM switching waveform, comparator 213 compares the signal level of the second periodic reference waveform Φ2, as supplied by dual phase sawtooth generator 114, with a reference voltage output by a duty cycle-controlling error amplifier 215.

Error amplifier 215 compares a fraction of the output voltage Vout2 at output node 245, as derived by a voltage divider 216, to which a feedback compensation filter 221 is coupled, with a reference voltage at a voltage reference node 265 at the output of a voltage reference buffer amplifier 260. Voltage reference buffer amplifier 260 provides a voltage equal to a prescribed fraction (one-half, in the present example) of the output voltage Vout1 produced by the upstream converter stage 100.

Figure 3:
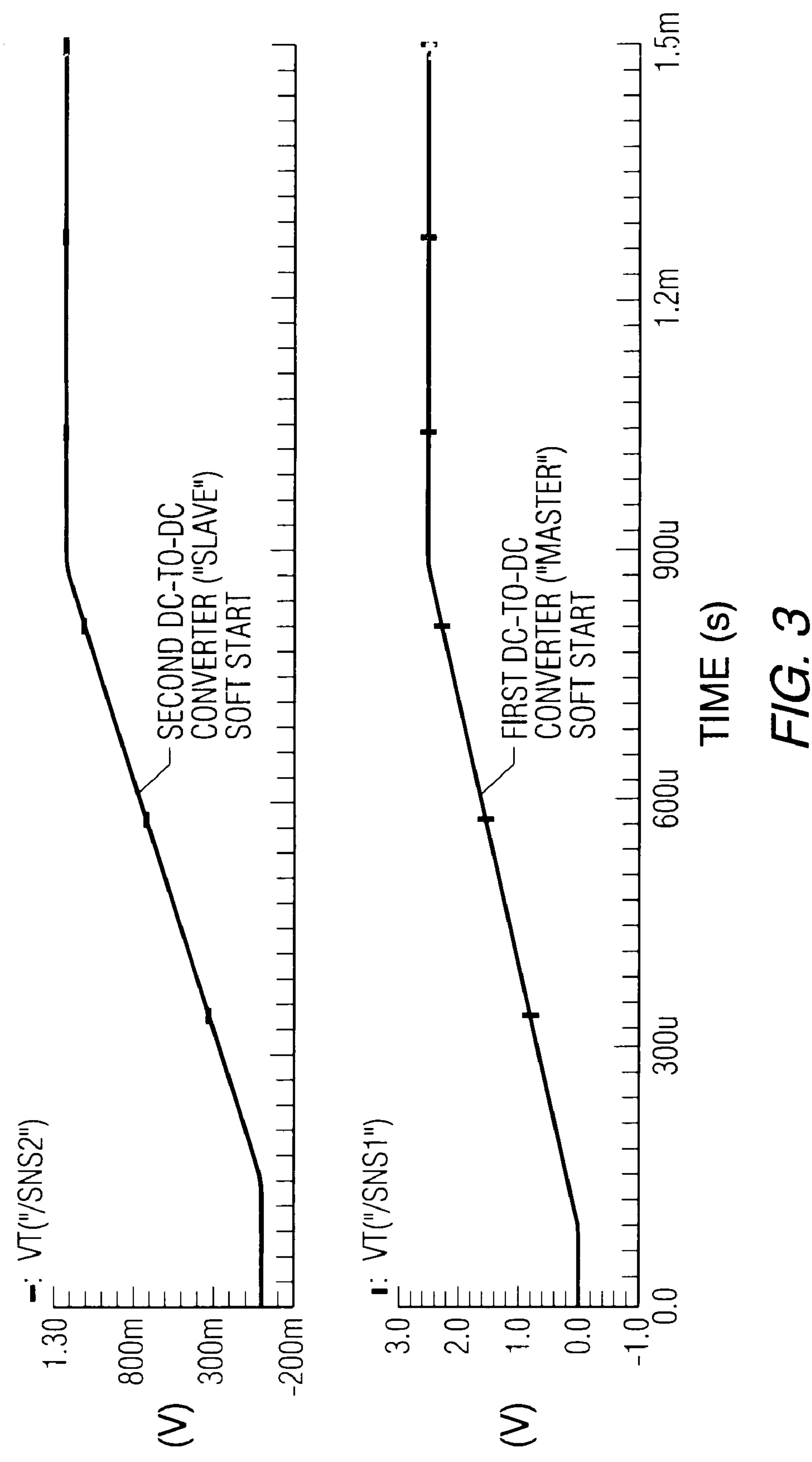
FIG. 3 shows timing diagrams illustrating transient responses of output voltages of the dual buck-mode PWM power supply of FIG. 2.

As pointed out above, since downstream converter stage 200 derives its input voltage from the output voltage Vout1 produced by upstream converter stage 100, the error amplifier 215 will track a prescribed fraction (e.g., one-half) of the upstream converter's output voltage (Vout1) throughout, and also after a soft start in the operation of upstream converter stage 100. As a consequence, the soft-start characteristics of the upstream DC-to-DC converter 100, as established by soft start circuit 117, will be effectively 'mirrored' in downstream DC-to-DC converter stage 200, eliminating the need for a separate soft start circuit in the downstream converter stage 200. FIG. 3 shows that the soft start transient response of the output voltage Vout2 of the downstream stage effectively tracks or mirrors that (Vout1) of the upstream stage.

The input to voltage reference buffer amplifier 260 is coupled through a voltage divider 262 to the voltage output Vout1 produced by the upstream converter stage 100. The output of the reference buffer amplifier 260 is further coupled to a ('keep alive') window regulator 270. Window regulator 270 is operative to produce a shutdown signal for the downstream converter 200, and is coupled to receive a voltage proportional to the second output voltage Vout2 produced at output node 245, and an externally supplied shutdown or inhibit signal (EXT INH).

The use of an external converter-shutdown signal provides the ability to selectively shut down the downstream converter stage, independently of the upstream converter stage. This serves to ameliorate one of the limitations of buckmode PWM converters —the fact that they typically consume a significant amount of power, even when not being used. Thus, one or both of DC-to-DC converters 100 and 200 may be shut down when not in use. Whenever the downstream converter stage 200 is in shut down mode, it is preferred that its output voltage Vout2 be maintained within a prescribed voltage window. Without this 'keep alive' voltage window confinement criterion, Vout2 might drift to a value that would prohibit a soft start after the shut down is concluded, unless a separate soft start circuit is in the downstream converter.

To avoid this potential problem, window regulator 270 is operative to maintain the value of the output voltage Vout2 produced by the downstream converter stage within a prescribed voltage window (e.g., +/−10%) of the regulated output voltage Vout1 (between 0.45 Vout1 and 0.55 Vout1, in present example), so that no soft start delay is needed when the second converter is turned back on. This is possible since, during the shut down interval, the loading on the output voltage Vout2 is typically relatively light, so that a fairly simple, light-duty regulator may be used for window regulator 270. For this purpose, window regulator 270 may be implemented as a resistor and a linear regulator, for example, although other suitable regulators known to those of skill in the art may alternatively be employed.

EXAMPLE

An embodiment of the dual buck mode power supply of the invention has been implemented in an integrated circuit, identified as part number ISL6530 by Intersil Corporation of Irvine, Calif., the assignee of the present application. Details regarding this part may be found in an advance data sheet, entitled "Dual 5V Buck and Synchronous Buck Pulse-Width Modulator (PWM) Controller for DDRAM Memory $V_{DDQ}$ and $V_{TT}$ Termination", a copy of which has been submitted as an Appendix.

As will be appreciated from the foregoing description, shortcomings of multi DC-DC converter architectures, including those described above, are effectively obviated by a cascaded buck mode converter power supply architecture, in which a downstream converter derives its input voltage from the upstream converter, and generates an output DC voltage that is a prescribed fraction of that input voltage. Cascading the two buck converter stages allows the functionality of control and monitoring (including soft start and overcurrent detection) circuitry of the upstream converter to also be used for the downstream converter, so as to realize a significant savings in chip area, cost, and complexity. Moreover, incorporating a relatively reduced circuit complexity voltage window regulator in the downstream converter ensures that, during shutdown, the output voltage produced by the downstream converter stage will be maintained within a prescribed window of its regulated output voltage, so that no soft start delay is needed when the second converter is turned back on.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A dual regulated DC voltage circuit comprising:

an upstream buck mode DC-DC converter, coupled to receive a power supply voltage at a first input and providing a first regulated DC output voltage at a first output; and a downstream buck mode DC-DC converter, having a second input coupled in cascade with said first output of said upstream buck mode DC-DC converter, so that said downstream buck mode DC-DC converter receives said first regulated DC output voltage at said second input, and providing, at a second output, a second regulated DC output voltage that is a fraction of said first regulated DC output voltage, said downstream buck mode DC-DC converter including a window regulator that is operative, in response to receipt of a shutdown signal applied thereto, to shut down said downstream buck mode DC-DC converter independently of the operation of said upstream buck mode DC-DC converter providing said first regulated DC output voltage, and to maintain said second regulated DC output voltage within a predetermined voltage window of said first regulated DC output voltage during shutdown of said downstream buck mode DC-DC converter, so that no soft start delay is needed when said downstream buck mode DC-DC converter is turned back on.

2. The dual regulated DC voltage circuit according to claim 1, wherein said upstream buck mode DC-DC converter includes an overcurrent detector and a soft start circuit, which respectively provide overcurrent protection and soft start operation for both of said upstream and downstream buck mode DC-DC converters.

3. The dual regulated DC voltage circuit according to claim 1, wherein said upstream buck mode DC-DC converter includes a first pair of output switching circuits coupled between a power supply voltage terminal and a voltage reference terminal, and having a common node thereof coupled through a first output inductor to said first output, and a first pulse width modulation driver circuit coupled to control the switching operation of said first pair of output switching circuits and thereby control the generation of said first regulated DC output voltage at a first output, and wherein said downstream buck mode DC-DC converter includes a second pair of output switching circuits coupled between said first output and said voltage reference terminal, and having a common node thereof coupled through a second output inductor to said second output, and a second pulse width modulation driver circuit coupled to control the switching operation of said second pair of output switching circuits and thereby control the generation of said second regulated DC output voltage at a second output, and further including a dual phase sawtooth generator for supplying first and second sawtooth waveforms, shifted in phase relative to one another, to said first and second pulse width modulation driver circuits for controlling the generation of first and second pulse width modulation signals supplied to said first and second driver circuits, respectively.

4. A method of generating a plurality of regulated DC output voltages from a single DC supply voltage comprising the steps of:

(a) coupling said single DC supply voltage to a first input of an upstream buck mode DC-DC converter, so as to cause said upstream buck mode DC-DC converter to output a first regulated DC output voltage at a first output;

(b) coupling a second input of a downstream buck mode DC-DC converter in cascade with said first output of said upstream buck mode DC-DC converter, so that said downstream buck mode DC-DC converter receives said first regulated DC output voltage at said second input, and outputs, at a second output, a second regulated DC output voltage that is a fraction of said first regulated DC output voltage; and (c) coupling a window regulator to said downstream buck mode DC-DC converter, said window regulator being operative, in response to receipt of a shutdown signal applied thereto, to shut down said downstream buck mode DC-DC converter independently of the operation of said upstream buck mode DC-DC converter outputting said first regulated DC output voltage, and to maintain said second regulated DC output voltage within a predetermined voltage window of said first regulated DC output voltage during shutdown of said downstream buck mode DC-DC converter, so that no soft start delay is needed when said downstream buck mode DC-DC converter is turned back on.

5. The method according to claim 4, wherein step (a) includes incorporating into said upstream buck mode DC-DC converter an overcurrent detector and a soft start circuit, which respectively provide overcurrent protection and soft start operation for both of said upstream and downstream buck mode DC-DC converters.

6. The method according to claim 4, wherein said upstream buck mode DC-DC converter includes a first pair of output switching circuits coupled between a power supply voltage terminal and a voltage reference terminal, and having a common node thereof coupled through a first output inductor to said first output, and a first pulse width modulation driver circuit coupled to control the switching operation of said first pair of output switching circuits and thereby control the generation of said first regulated DC output voltage at a first output, and wherein said downstream buck mode DC-DC converter includes a second pair of output switching circuits coupled between said first output and said voltage reference terminal, and having a common node thereof coupled through a second output inductor to said second output, and a second pulse width modulation driver circuit coupled to control the switching operation of said second pair of output switching circuits and thereby control the generation of said second regulated DC output voltage at a second output, and further comprising the step (d) of providing a dual phase sawtooth generator that supplies first and second sawtooth waveforms, shifted in phase relative to one another, to said first and second pulse width modulation driver circuits for controlling the generation of first and second pulse width modulation signals supplied to said first and second driver circuits, respectively.

7. In a dual regulated DC voltage circuit that comprises:

an upstream buck mode DC-DC converter, coupled to receive a power supply voltage at a first input and providing a first regulated DC output voltage at a first output; and a downstream buck mode DC-DC converter, having a second input coupled in cascade with said first output of said upstream buck mode DC-DC converter, so that said downstream buck mode DC-DC converter receives said first regulated DC output voltage at said second input, and providing, at a second output, a second regulated DC output voltage that is a fraction of said first regulated DC output voltage;

the improvement wherein:

said downstream buck mode DC-DC converter includes a window regulator that is operative, in response to receipt of a shutdown signal applied thereto, to shut down said downstream buck mode DC-DC converter independently of the operation of said upstream buck mode DC-DC converter providing said first regulated DC output voltage, and to maintain said second regulated DC output voltage within a predetermined voltage window of said first regulated DC output voltage during shutdown of said downstream buck mode DC-DC converter, so that no soft start delay is needed when said downstream buck mode DC-DC converter is turned back on.

8. The improvement according to claim 7, wherein said upstream buck mode DC-DC converter includes an overcurrent detector and a soft start circuit, which respectively provide overcurrent protection and soft start operation for both of said upstream and downstream buck mode DC-DC converters.

9. The improvement according to claim 7, wherein said upstream buck mode DC-DC converter includes a first pair of output switching circuits coupled between a power supply voltage terminal and a voltage reference terminal, and having a common node thereof coupled through a first output inductor to said first output, and a first pulse width modulation driver circuit coupled to control the switching operation of said first pair of output switching circuits and thereby control the generation of said first regulated DC output voltage at a first output, and wherein said downstream buck mode DC-DC converter includes a second pair of output switching circuits coupled between said first output and said voltage reference terminal, and having a common node thereof coupled through a second output inductor to said second output, and a second pulse width modulation driver circuit coupled to control the switching operation of said second pair of output switching circuits and thereby control the generation of said second regulated DC output voltage at a second output, and further including a dual phase sawtooth generator for supplying first and second sawtooth waveforms, shifted in phase relative to one another, to said first and second pulse width modulation driver circuits for controlling the generation of first and second pulse width modulation signals supplied to said first and second driver circuits, respectively.

* * * * *